(12) United States Patent
Nelson et al.

(10) Patent No.: US 10,829,083 B2
(45) Date of Patent: Nov. 10, 2020

(54) PIVOTING SEAT BELT SYSTEM

(71) Applicant: Deere & Company, Moline, IL (US)

(72) Inventors: Amy Nelson, Sun Prairie, WI (US); Mark Mayefske, Sun Prairie, WI (US)

(73) Assignee: Deere & Company, Moline, IL (US)

( * ) Notice: Subject to any disclaimer, the term of this patent is extended or adjusted under 35 U.S.C. 154(b) by 108 days.

(21) Appl. No.: 16/174,859

(22) Filed: Oct. 30, 2018

(65) Prior Publication Data

US 2020/0130637 A1 Apr. 30, 2020

(51) Int. Cl.
| | | |
|---|---|---|
| *B60R 22/20* | (2006.01) | |
| *B60R 22/34* | (2006.01) | |
| *A01D 34/82* | (2006.01) | |
| *A01D 101/00* | (2006.01) | |
| *B60R 21/13* | (2006.01) | |

(52) U.S. Cl.
CPC .......... *B60R 22/20* (2013.01); *A01D 34/828* (2013.01); *B60R 22/34* (2013.01); *A01D 2101/00* (2013.01); *B60R 21/131* (2013.01); *B60R 2022/3402* (2013.01); *B60Y 2200/223* (2013.01)

(58) Field of Classification Search
CPC ....... B60R 22/20; B60R 22/34; B60R 21/131; B60R 2022/3402; A01D 34/828; B60Y 2200/223
See application file for complete search history.

(56) References Cited

U.S. PATENT DOCUMENTS

| | | | |
|---|---|---|---|
| 4,118,068 A * | 10/1978 | Fohl | B60R 22/22 297/481 |
| 4,225,184 A | 9/1980 | Strowick | |
| 4,611,854 A * | 9/1986 | Pfeiffer | B60R 22/22 280/801.1 |
| 4,682,790 A * | 7/1987 | Katsuno | B60R 22/20 280/801.1 |
| 5,431,446 A | 7/1995 | Czarnecki et al. | |
| 5,476,286 A * | 12/1995 | Delfino | B60R 22/20 280/801.2 |
| 6,467,849 B1 | 10/2002 | Deptolla | |
| 6,715,792 B2 | 4/2004 | Yamachi et al. | |
| 9,227,593 B2 * | 1/2016 | Hirako | B60R 22/26 |
| 9,802,570 B1 * | 10/2017 | Elton | B60R 22/22 |
| 2002/0130498 A1 * | 9/2002 | Kurata | B60R 21/18 280/733 |
| 2008/0084081 A1 * | 4/2008 | Shibaoka | B60K 26/02 296/1.02 |
| 2010/0096200 A1 * | 4/2010 | Bombarda | B62J 17/08 180/65.31 |
| 2014/0000667 A1 * | 1/2014 | Biers, Sr. | B60J 11/00 135/88.01 |
| 2016/0057924 A1 * | 3/2016 | Asahara | A01D 67/00 180/6.5 |
| 2019/0092274 A1 * | 3/2019 | Nakaji | B60R 22/26 |

* cited by examiner

*Primary Examiner* — Frank B Vanaman

(57) ABSTRACT

A pivoting seat belt system includes a seat belt retractor and a seat belt receiver, each of which are pivotably mounted to a head of a bracket that is pivotably mounted to a ROPS located behind an operator seat of a zero turn mower. The head of each bracket restricts the angle of pivoting of the seat belt retractor and seat belt receiver, and a slot in each bracket restricts the angle of pivoting on the ROPS.

10 Claims, 5 Drawing Sheets

PIVOTING SEAT BELT SYSTEM

FIELD OF THE INVENTION

This invention relates to seat belts for zero turn mowers and riding lawn tractors.

BACKGROUND OF THE INVENTION

Some zero turn mowers and riding lawn tractors have seat belts. In the past, seat belts on the grass mowing machines were mounted with bolts or other fasteners directly onto the seat, and the seat pan was secured to the vehicle frame. These seat belts can move along with the seat whenever the operator adjusts the seat position fore and aft. Some riding lawn tractors or zero turn mowers have seats that are not compatible with mounting seat belts. These vehicles may have seat belts mounted to the vehicle frame instead of the seat. Vehicle frame-mounted seat belts may be adjusted when the operator adjusts the seat position, but are less comfortable than seat-mounted seat belts. A vehicle frame-mounted seat belt system for riding lawn tractors and zero turn mowers is needed that provides improved ride comfort. A seat belt system for riding lawn tractors and zero turn mowers is needed that is independent of the seat system, and may be used with a variety of different seats.

SUMMARY OF THE INVENTION

A pivoting seat belt system includes a first bracket and a second bracket. The first bracket is pivotably mounted with a top mounting bolt to a first ROPS member of a grass mowing machine and extends generally forwardly from the first ROPS member alongside an operator seat. The second bracket is pivotably mounted with a top mounting bolt to a second ROPS member of the grass mowing machine and extends generally forwardly from the second ROPS member alongside the operator seat. The second bracket pivots independently of the first bracket. The system also includes a seat belt retractor pivotably mounted to the first bracket, and a seat belt receiver pivotably mounted to the second bracket. A head on each of the first and second brackets limiting the pivoting of the seat belt retractor and seat belt receiver.

DESCRIPTION OF THE PREFERRED EMBODIMENT

Figure 1:
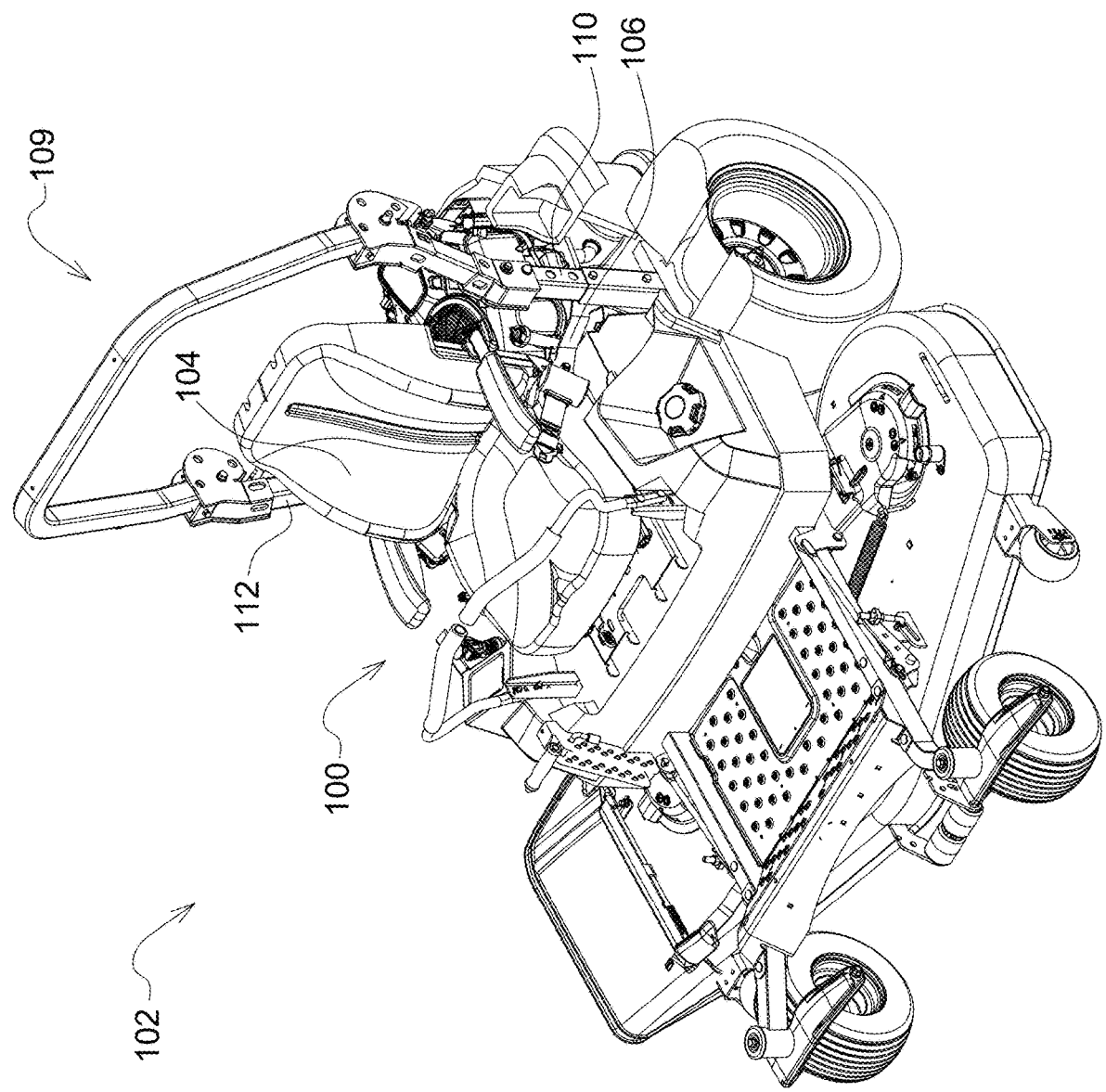
FIG. 1 is a perspective view of a zero turn mower with a pivoting seat belt system according to a first embodiment of the invention.
Figure 2:
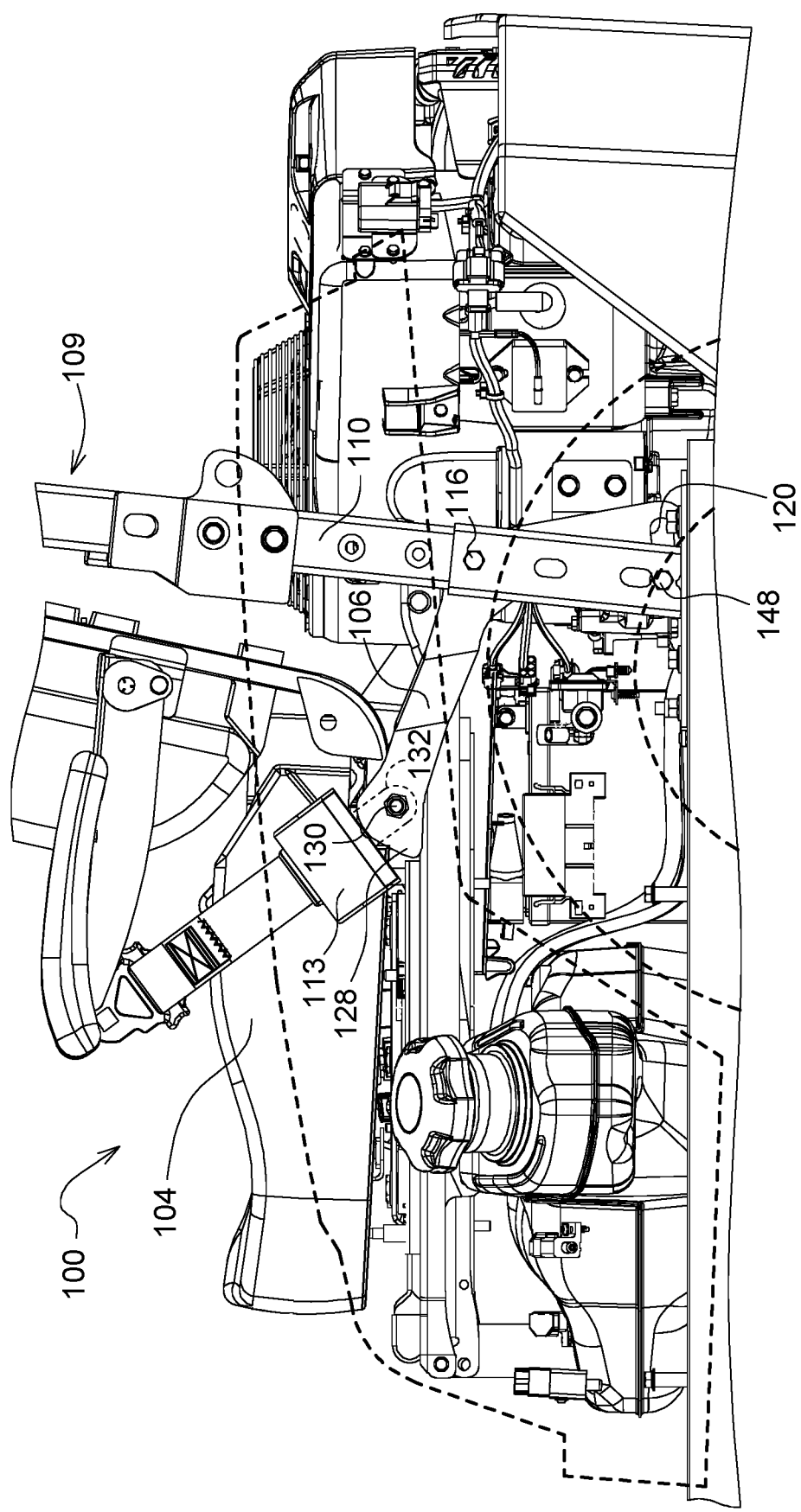
FIG. 2 is a left side view of a pivoting seat belt system on a zero turn mower in a first position according to a first embodiment of the invention.

In one embodiment of the invention shown in FIGS. 1-5, pivoting seat belt system 100 may be mounted to the vehicle frame of riding lawn tractor or zero turn mower 102. The riding lawn tractor or zero turn mower may have an adjustable seat 104, such as a seat mount assembly described in U.S. Pat. No. 6,945,505 or 7,648,115. However, the pivoting seat belt system may be independent of the seat system, and may be used with other seat systems or configurations. For example, the pivoting seat belt system may accommodate seat suspensions that allows seat movement in the fore-aft and vertical directions. Additionally, the pivoting seat belt system may continue to pivot after the receiver and retractor are connected together, and may continue to pivot during operation.

In one embodiment, pivoting seat belt system 100 may include a first or left bracket 106 and a second or right bracket 108. Each bracket 106, 108 may be pivotably mounted to ROPS (roll over protection system) 109 or another vehicle frame member behind and to the side of operator seat 104. For example, one of the brackets may be pivotably mounted to a first vertically aligned ROPS member 110, and the other bracket may be pivotably mounted to a second vertically aligned ROPS member 112. Alternatively, each bracket may be pivotably mounted to separate frame members of the vehicle. Each bracket may extend forwardly from the frame or ROPS member, with one bracket extending forwardly on each side of the seat. For example, each bracket may be a generally L-shaped rigid bar stamped from sheet metal with a thickness of about ¼ inch.

In one embodiment, as shown in FIGS. 2-5, pivoting seat belt system 100 may provide two pivot axes for each bracket 106, 108. The first pivot axis for each bracket may be a horizontal axis 116, 122 where each bracket 106, 108 may be pivotably mounted to the vehicle frame or ROPS. The second pivot axis may be a horizontal axis 130, 138 where seat belt retractor 113 and seat belt receiver 115 are each pivotably mounted to the head 128, 130 of one of the brackets. Each bracket may pivot on the first pivot axis independently of the other bracket. Additionally, the seat belt retractor and receiver each may pivot on the second pivot axis independently of the other.

In one embodiment, pivoting seat belt system 100 may include first or left bracket 106 pivotably mounted to the left ROPS member 110 or left side of the vehicle frame. The first or left bracket may be mounted to the ROPS member with a top mounting bolt so that the bracket may pivot on axis 116, and the pivotal movement may be restricted by lower mounting bolt 148. Slot 120 may be provided in the lower end of bracket 106 to limit how far the bracket may pivot on the horizontal pivot axis of the top mounting bolt. For example, bracket 106 may pivot on axis 116 up to a maximum of about 45 degrees between the fully lowered position in FIG. 2 and the fully raised position in FIG. 3.

Figure 4:
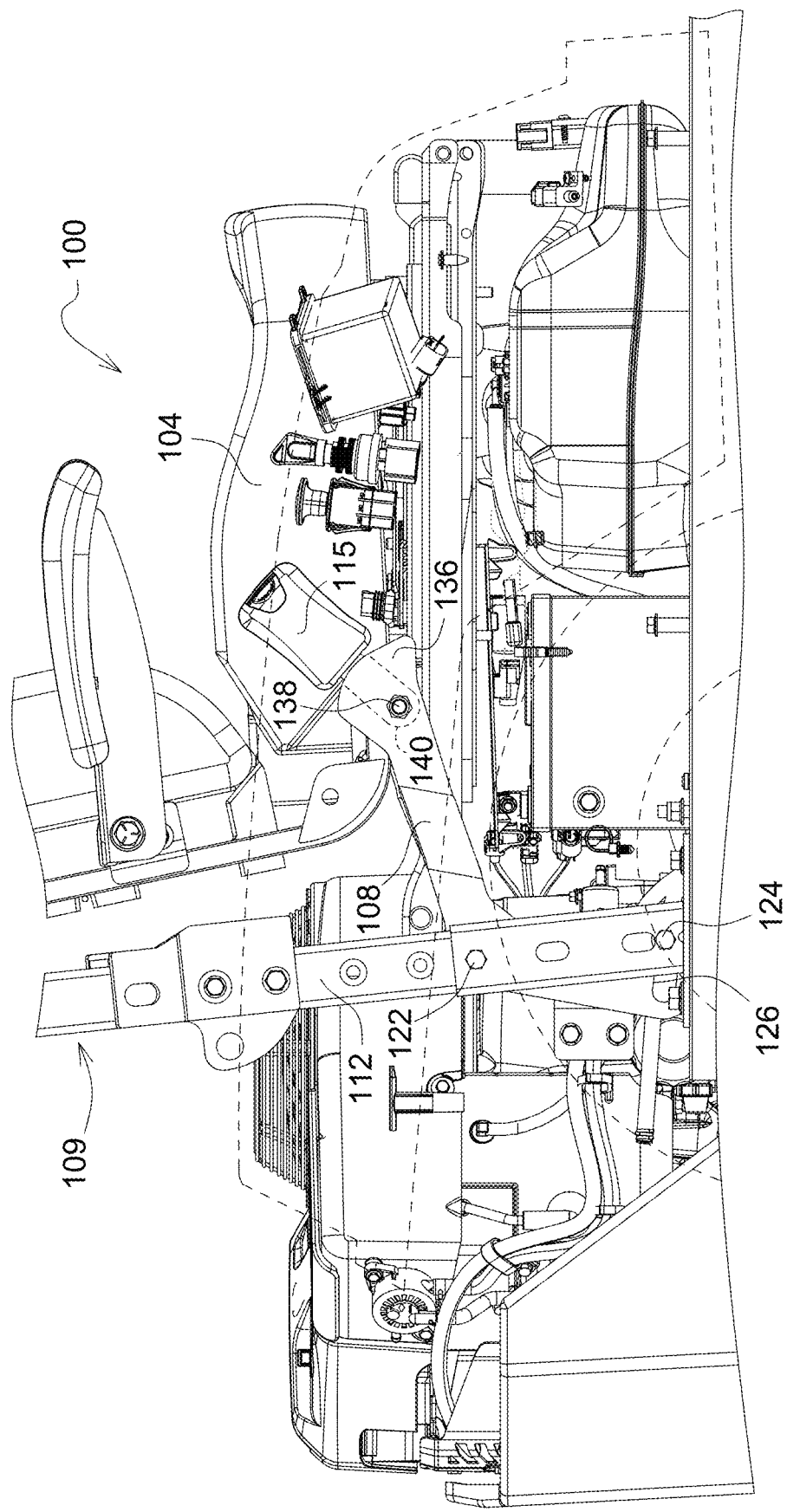
FIG. 4 is a right side view of a pivoting seat belt system on a zero turn mower in a first position according to a first embodiment of the invention.
Figure 5:
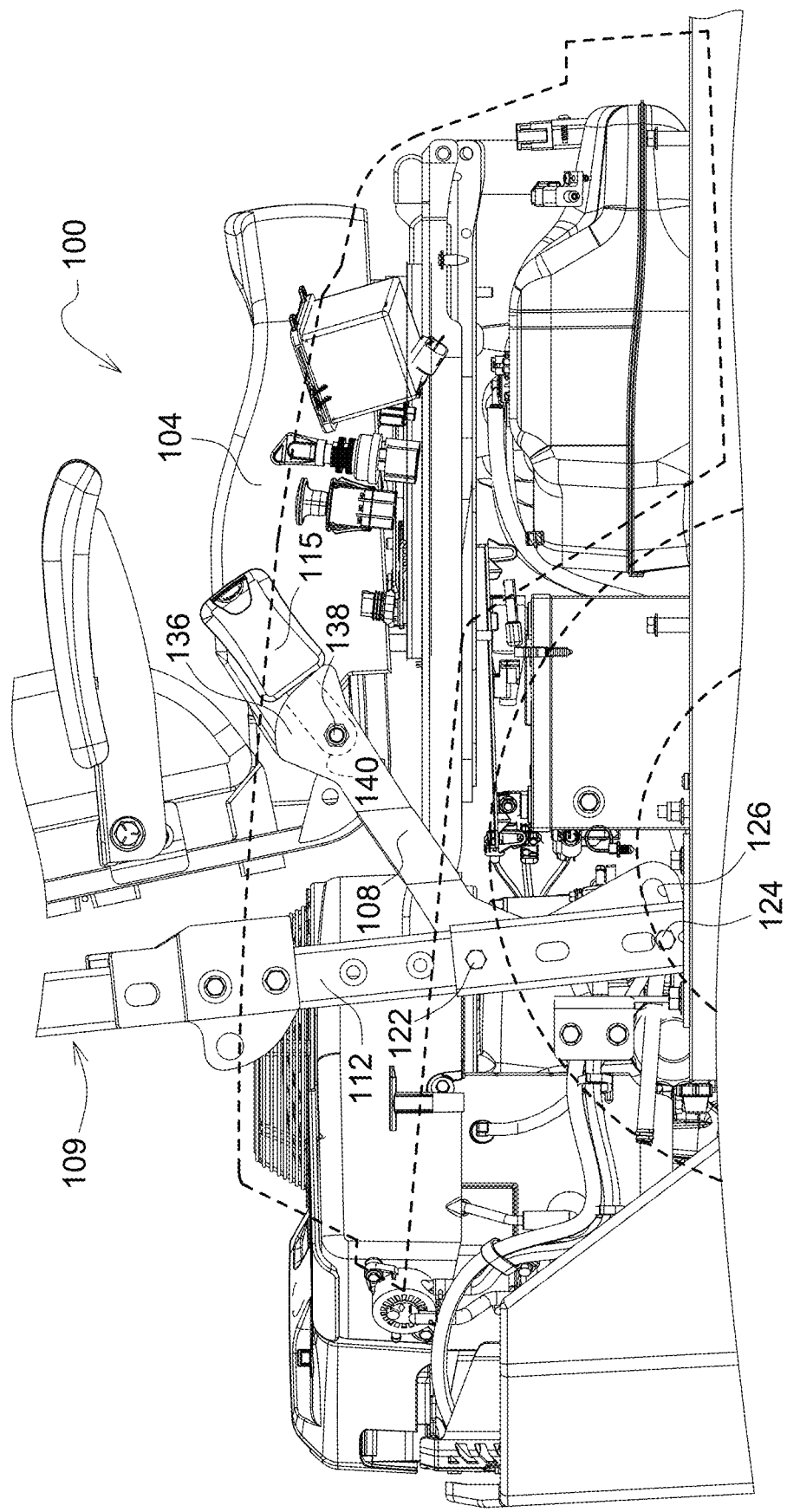
FIG. 5 is a right side view of a pivoting seat belt system on a zero turn mower in a second position according to a first embodiment of the invention.

In one embodiment, pivoting seat belt system 100 may include second or right bracket 108 pivotably mounted to the right ROPS member 112 or right side of the vehicle frame adjacent the seat. The second or right bracket may pivot on the horizontal axis of top mounting bolt 122, and the pivoting may be restricted by lower mounting bolt 124. Slot 126 may be provided in the lower end of the bracket to limit how far the bracket may pivot on the horizontal pivot axis of the top mounting bolt. The lower mounting bolt can move to any position within the slot, without any set positions. FIG. 4 shows bracket 108 at a lowered position, and FIG. 5 shows bracket 108 pivoted up to a raised position.

Figure 3:
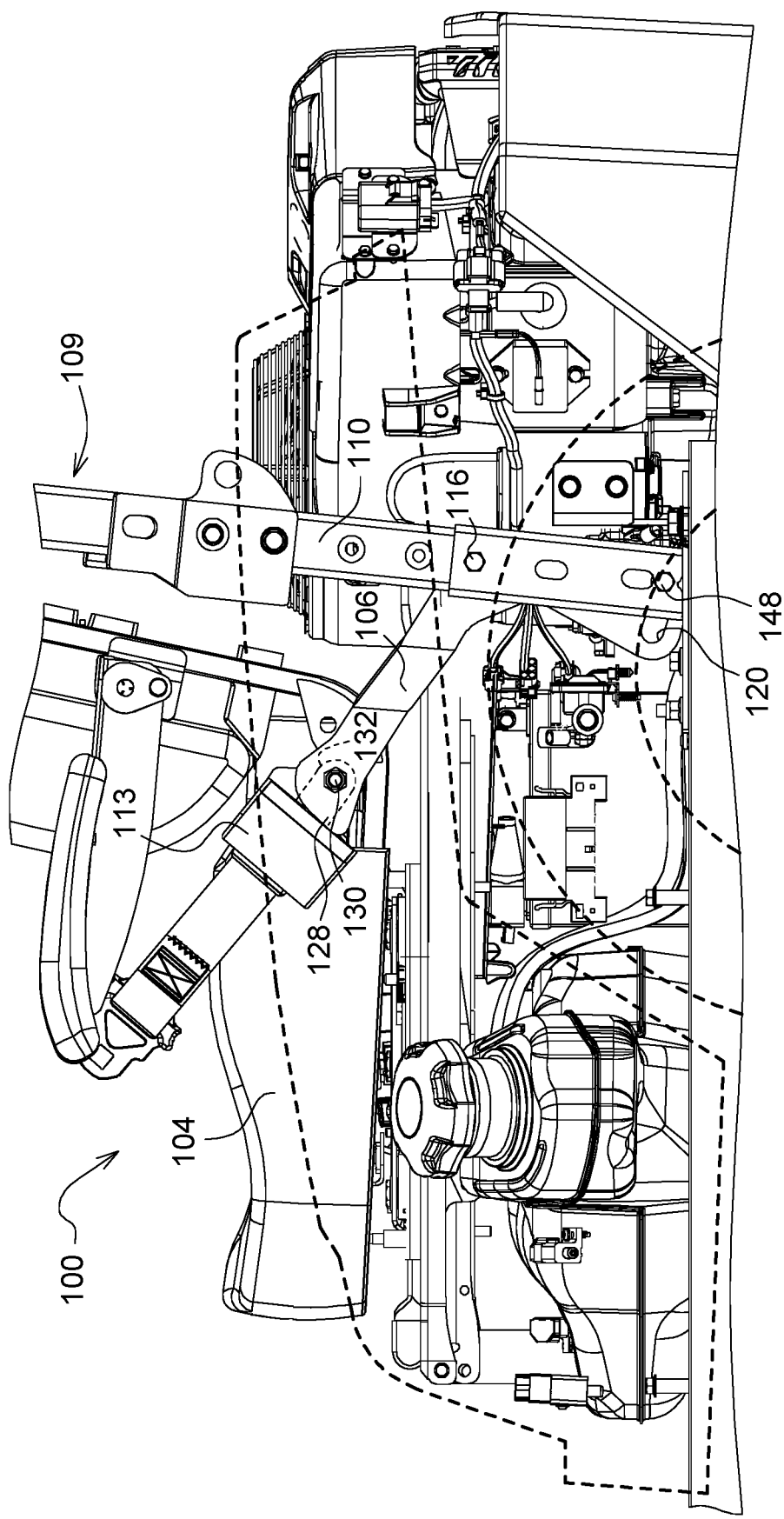
FIG. 3 is a left side view of a pivoting seat belt system on a zero turn mower in a second position according to a first embodiment of the invention.

In one embodiment, pivoting seat belt system 100 may include seat belt retractor 113 pivotably mounted to the head 128 of the first or left bracket 106. For example, shoulder bolt 130 may be inserted through strap 132 extending from seat belt retractor 113, and through a hole in the head 128 of bracket 106. The seat belt retractor may pivot relative to the bracket, to a maximum such as 140 degrees, to help prevent the seat belt retractor from pivoting behind or below the seat. For example, as shown in FIG. 3, the head of the bracket may provide an upper stop where the seat belt retractor may be fully extended from the head of the bracket. The head of the bracket also may provide a lower stop where the seat belt retractor may be pivoted back down to about 140 degrees from the fully extended position.

In one embodiment, pivoting seat belt system may include seat belt receiver 115 pivotably mounted to the head 136 of the second or right bracket 108. For example, shoulder bolt 138 may be inserted through strap 140 extending from seat belt receiver 115, and through a hole in head 136 of bracket 108. The seat belt receiver may pivot relative to the bracket, to a maximum of about 140 degrees, to help prevent the seat belt receiver from pivoting behind or below the seat. For example, as shown in FIG. 5, the head of bracket 108 may provide an upper stop where the seat belt receiver may be fully extended from the head of the bracket, and a lower stop where the seat belt receiver may be pivoted back down to about 140 degrees from the fully extended position.

Having described the preferred embodiments, it will become apparent that various modifications can be made without departing from the scope of the invention as defined in the accompanying claims.

The invention claimed is:

1. A pivoting seat belt system, comprising:
a first bracket and a second bracket, the first bracket having a first pivot axis on a first member of a roll over protection system (ROPS) and having a first end extending generally forwardly from the first ROPS member alongside an operator seat to a head of the first bracket having a second pivot axis, and a second end extending generally downwardly along the first ROPS member to a stop that limits pivoting on the first pivot axis; the second bracket having a first pivot axis on a second member of the ROPS and extending generally forwardly from the second ROPS member alongside the operator seat to a head of the second bracket having a second pivot axis, and a second end extending generally downwardly along the second ROPS member to a stop that limits pivoting on the first pivot axis; each pivot axis on the second bracket pivoting independently of each pivot axis on the first bracket; and
a seat belt retractor pivotably mounted on the second pivot axis of to the first bracket, and a seat belt receiver pivotably mounted on the second pivot axis of the second bracket; the head on each of the first and second brackets limiting the pivoting of the seat belt retractor and seat belt receiver on each second pivot axis.

2. The pivoting seat belt system of claim 1 further comprising a lower mounting bolt extending through a slot in a lower end of each bracket limiting how far each bracket may pivot on each first pivot axis.

3. The pivoting seat belt system of claim 1 wherein the first bracket and the second bracket are generally L-shaped rigid bars.

4. The pivoting seat belt system of claim 1 wherein each of the brackets are mounted to an upright ROPS member behind the operator seat.

5. A pivoting seat belt system, comprising:
a first bracket and a second bracket, each bracket independently mounted on a first horizontal pivot axis to an upright of a rollover protection system (ROPS), each bracket having a first end extending forwardly from the first horizontal pivot axis alongside a seat, and a second end extending downwardly from the first horizontal pivot axis alongside one of the uprights; and
a seat belt retractor and a seat belt receiver, each of the seat belt retractor and seat belt receiver independently mounted on a second horizontal pivot axis to the first end of one of the first and second brackets.

6. The pivoting seat belt system of claim 5 further comprising a slot in the second end of each bracket limiting the pivoting of the bracket on the first horizontal pivot axis.

7. The pivoting seat belt system of claim 5 further comprising a head on the first end of each bracket limiting the pivoting of the seat belt retractor and seat belt receiver on the second horizontal pivot axis.

8. The pivoting seat belt system of claim 5 wherein each bracket is a generally L-shaped sheet metal bar.

9. A pivoting seat belt system, comprising:
a seat belt retractor and a seat belt receiver, each of the seat belt retractor and the seat belt receiver being pivotably mounted to a head of one of a pair of brackets that are pivotably mounted to a pair of roll over protection system (ROPS) upright members located behind an operator seat of a zero turn mower, each of the pair of brackets having a first portion extending forward from the ROPS upright members to the head and a second portion extending downward from the ROPS upright members below the seat;
the head on the first portion of each bracket restricting the angle of pivoting of the seat belt retractor and seat belt receiver, and a slot in the second portion of each bracket restricting the angle of pivoting of the bracket relative to the ROPS upright members.

10. The pivoting seat belt system of claim 9 wherein each bracket is generally L-shaped.

* * * * *